(12) United States Patent
DeMars

(10) Patent No.: US 6,606,987 B2
(45) Date of Patent: Aug. 19, 2003

(54) COOKING APPARATUS

(75) Inventor: Robert A. DeMars, Woodland Hills, CA (US)

(73) Assignee: Original Ideas, Calabasas, CA (US)

( * ) Notice: Subject to any disclaimer, the term of this patent is extended or adjusted under 35 U.S.C. 154(b) by 268 days.

(21) Appl. No.: 09/736,847

(22) Filed: Dec. 13, 2000

(65) Prior Publication Data

US 2002/0069866 A1 Jun. 13, 2002

(51) Int. Cl.⁷ .................................................. A47J 37/07
(52) U.S. Cl. ........................ 126/38; 126/9 R; 126/41 R; 126/39 B; 126/40; 126/50; 126/304 R; 126/305; 126/337 R
(58) Field of Search ..................... 126/37 A, 37 R, 126/38, 9 R, 9 A, 9 B, 37 B, 304 R, 305, 306, 304 A, 40, 39 B, 50, 25 R, 41 R, 337 R; 312/242, 236, 237, 282, 324, 334

(56) References Cited

U.S. PATENT DOCUMENTS

| | | | | |
|---|---|---|---|---|
| 948,717 A | * | 2/1910 | Avery | 126/25 R |
| 1,139,212 A | * | 5/1915 | Morgan | 126/25 R |
| 1,302,911 A | | 5/1919 | Gilbert | |
| 1,438,345 A | * | 12/1922 | Tait et al. | 126/9 R |
| 1,438,845 A | | 12/1922 | Tait et al. | |
| 1,478,371 A | * | 12/1923 | Albrighton | 190/12 R |
| 1,483,159 A | | 2/1924 | Coleman | |
| 1,531,405 A | * | 3/1925 | Lehman | 126/39 H |
| 1,654,330 A | * | 12/1927 | Jenkins | 296/22 |
| D91,639 S | * | 2/1934 | Stulik | D7/332 |
| 1,952,776 A | * | 3/1934 | Quinlin | 126/376.1 |
| 2,021,915 A | * | 11/1935 | Hancock et al. | 126/25 R |
| 2,154,305 A | * | 4/1939 | Goerl | 126/38 |
| 2,246,440 A | * | 6/1941 | Hester | 126/8 |
| 2,484,239 A | * | 10/1949 | Moon et al. | 126/25 R |
| 2,559,710 A | * | 7/1951 | Danielson | 126/9 R |
| 2,742,892 A | * | 4/1956 | Herzer | 126/502 |
| 2,791,959 A | * | 5/1957 | Pirz | 99/421 R |
| 2,985,164 A | * | 5/1961 | Imoto | 126/25 R |
| 3,005,451 A | * | 10/1961 | Richart | 126/25 R |
| 3,094,113 A | | 6/1963 | Avila | |
| 3,330,266 A | * | 7/1967 | Stephen | 126/25 R |
| 3,459,171 A | * | 8/1969 | Swanson | 126/25 R |
| 3,611,912 A | | 10/1971 | Choc | |
| 3,665,913 A | * | 5/1972 | Cagle, Jr. | 126/25 R |
| D229,660 S | * | 12/1973 | Gammon | D7/332 |
| 3,791,368 A | | 2/1974 | Hunt et al. | |
| 3,791,370 A | * | 2/1974 | Fauser | 126/25 A |
| 3,915,529 A | * | 10/1975 | Bernier | 312/237 |
| D251,893 S | | 5/1979 | Chan | |
| 4,170,173 A | * | 10/1979 | Bradford | 99/341 |
| D285,522 S | * | 9/1986 | Basini | D7/334 |
| 4,616,624 A | * | 10/1986 | Parker | 126/9 R |
| D291,399 S | | 8/1987 | Chan | |
| D325,318 S | * | 4/1992 | Parent et al. | D7/334 |
| 5,293,859 A | | 3/1994 | Lisker | 126/26 |
| 5,359,988 A | * | 11/1994 | Hait | 126/25 R |
| 5,832,915 A | | 11/1998 | Skidmore et al. | |
| 5,960,788 A | | 10/1999 | Bach et al. | |
| 5,970,971 A | * | 10/1999 | Wu | 126/38 |
| 6,142,140 A | * | 11/2000 | Shumaker | 126/9 B |
| 6,254,160 B1 | * | 7/2001 | Marriott et al. | 296/24.1 |
| 6,302,097 B1 | * | 10/2001 | Rivera | 126/38 |
| D450,524 S | * | 11/2001 | Measom | D7/332 |

* cited by examiner

Primary Examiner—Carl Price
(74) Attorney, Agent, or Firm—Dan M. de la Rosa

(57) ABSTRACT

A cooking apparatus is provided comprising a fire bowl having an internal chamber, a grill located within the internal chamber and at least one shelf pivotally mounted to the fire bowl. The shelf is movable between a stowage position within the fire bowl to a usage position located externally of the fire bowl.

38 Claims, 12 Drawing Sheets

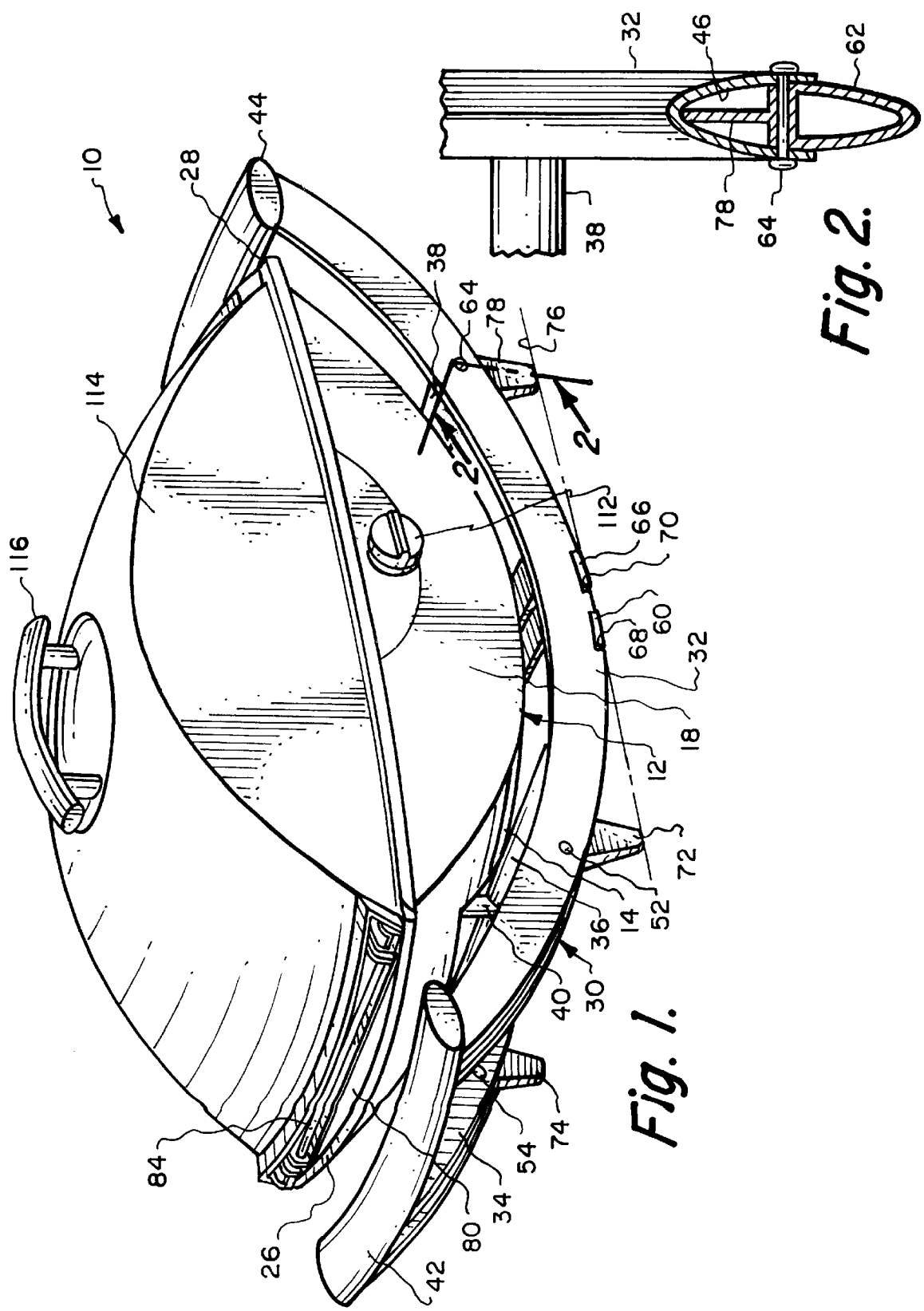

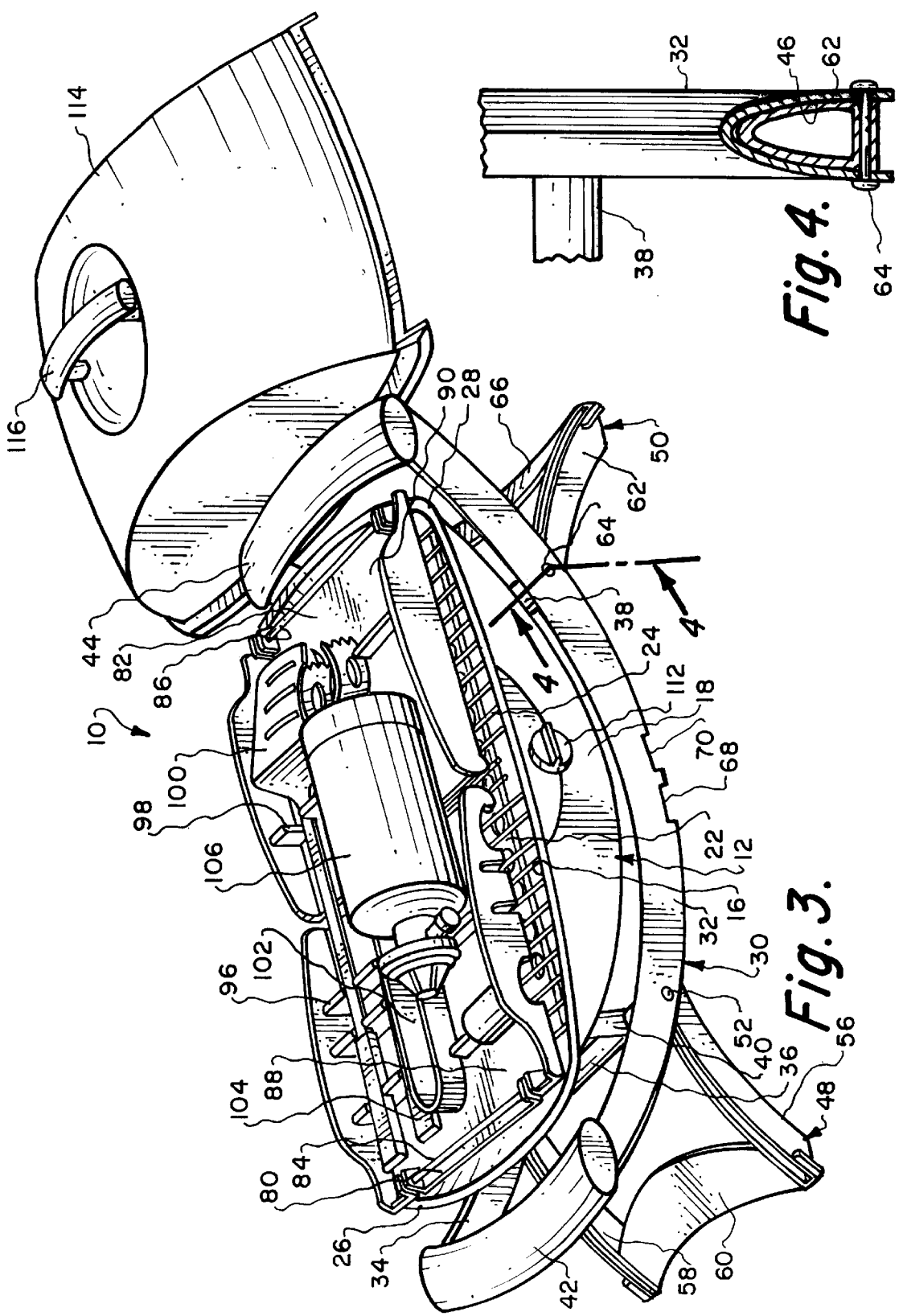

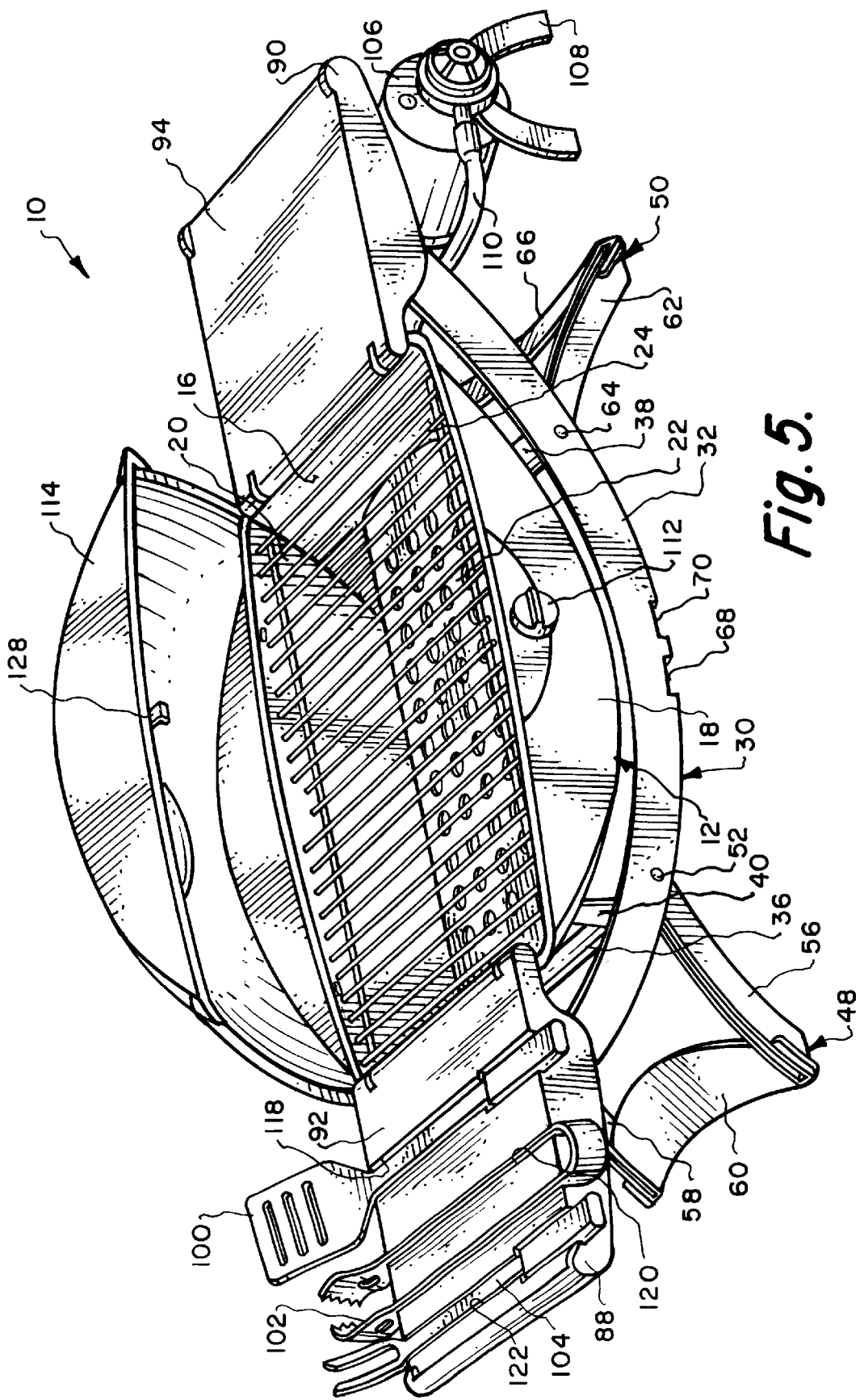

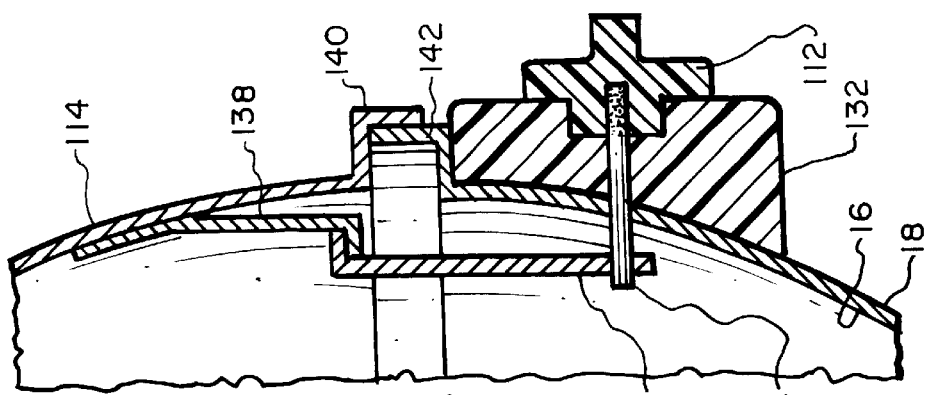
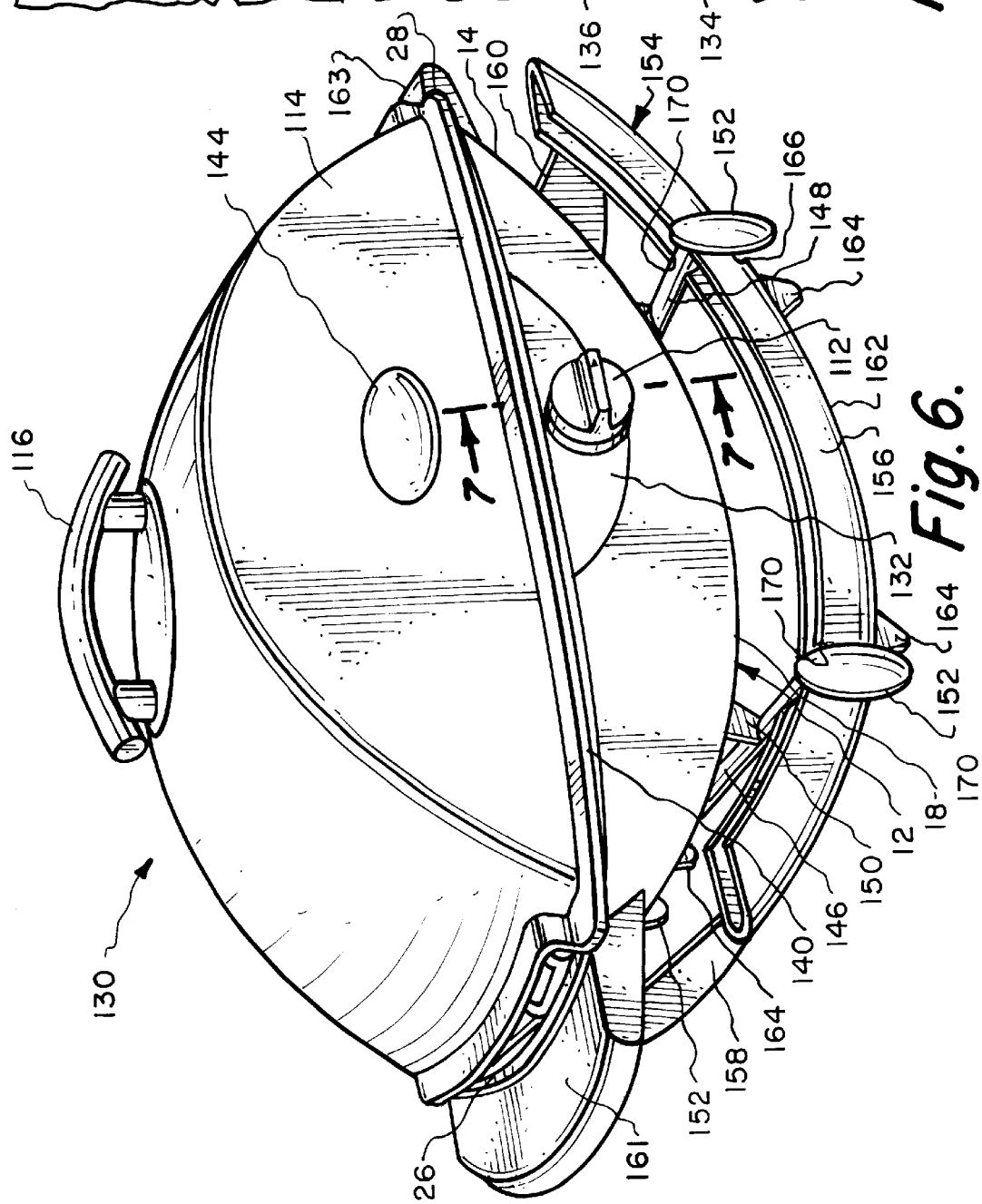

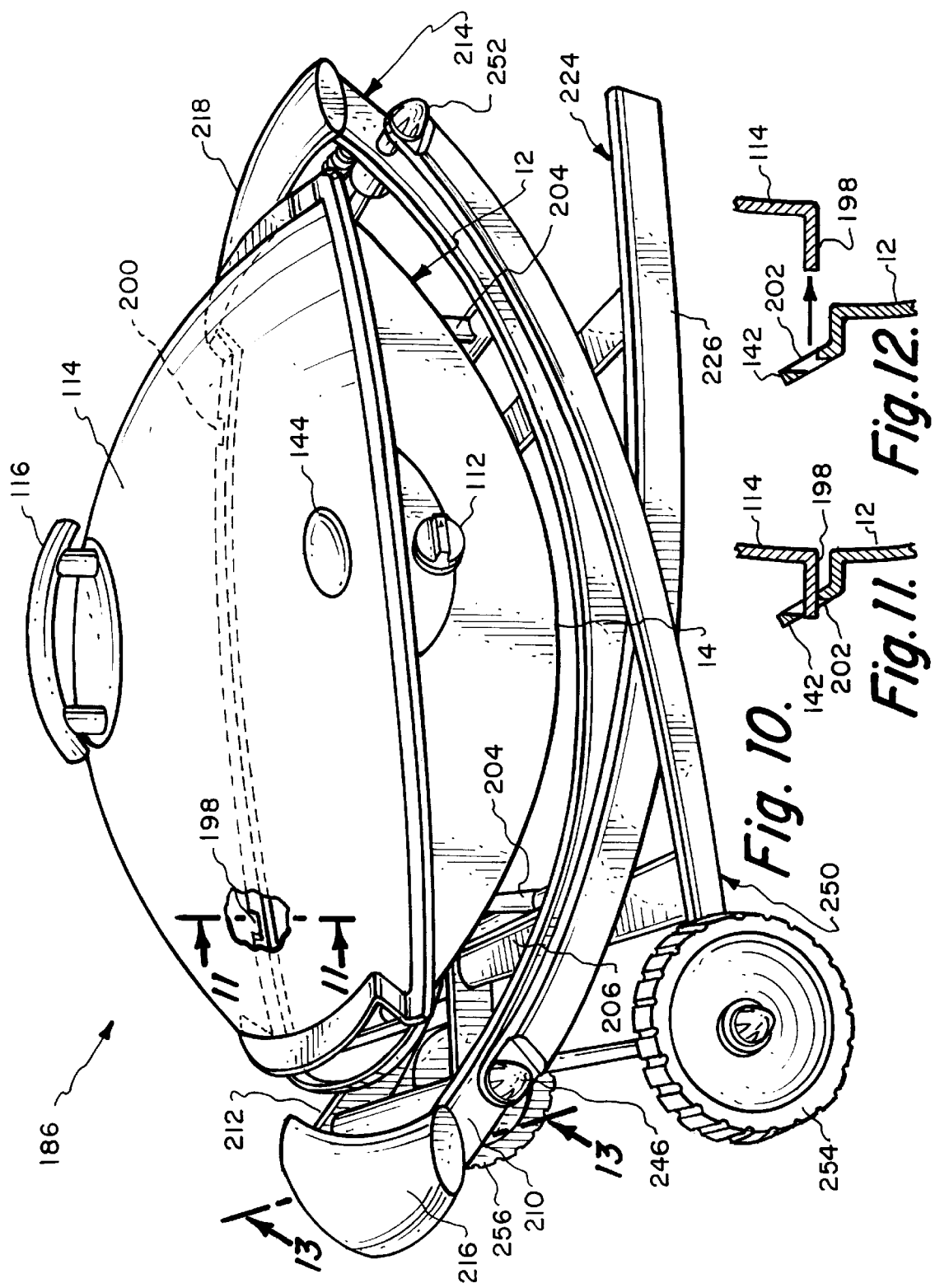

COOKING APPARATUS

BACKGROUND OF THE INVENTION

1. Field of the Invention

The field of this invention relates to cooking appliances and more particularly to a cooking apparatus cooking apparatus for cooking of food on an outdoor grill.

2. Description of the Related Art

Fixed outdoor fireplaces have been known for many years. Typically, these fireplaces are constructed of brick, masonry and or metal. Within recent years, there have been entered into the marketplace portable outdoor fireplaces, which are commonly referred to as cooking apparatus for barbecues. The size of these cooking apparatuses is small and such are compact and are readily convenient to being moved from one location to another, such as being used at the beach or other outdoor location, and readily transported within a vehicle, such as an automobile.

Typically, in the past, cooking apparatuses have included a fire bowl and a separate bag of charcoal or gas tank and separate utensils. There never has really been designed a cooking apparatus which is designed specifically to be compact and include all the different components required to operate the barbecue and be mounted in storage locations within the fire bowl with these components to be removed prior to usage of the barbecue.

Also, in the past, cooking apparatuses have not been designed to be especially attractive. Attractiveness is a desirable feature for consumers to be willing to purchase such cooking apparatuses.

Additionally, cooking apparatuses of the prior art that have planar or slightly bowed sidewalls (as opposed to having a bowl shape) have not been designed to be an effective cooking instrument. If a fire bowl has an arcuate curved bottom wall, it will facilitate the reflection of heat toward the cooking grill. Previously, fire bowls of cooking apparatuses that have planar or slightly bowed sidewalls have not been properly designed in order to maximize the application of heat to the cooking grill.

SUMMARY OF THE INVENTION

In one embodiment, the present invention relates to a cooking apparatus comprising a fire bowl and at least one shelf pivotally mounted to the fire bowl, wherein the shelf is movable between a stowage position within the fire bowl to a usage position located externally of the fire bowl. In another embodiment, the fire bowl has an internal chamber and the apparatus further comprises a grill located within the internal chamber. In another embodiment, the apparatus has a second shelf pivotally mounted to the fire bowl, wherein the second shelf is movable between a stowage position within the fire bowl to a usage position located exteriorly of the fire bowl. In still another embodiment, the first shelf is aligned with the second shelf in both the stowage position and the usage position. In yet another embodiment, fire bowl terminates into at least one end portion and the shelf is pivotally mounted to the end portion.

In still yet another embodiment, the fire bowl is mounted on a supporting frame and the apparatus further comprises at least one leg. In a further embodiment, the fire bowl is mounted on a supporting frame where the supporting frame has at least one handle and the shelf rests on the handle when the shelf is in the usage position. In still a further embodiment, the supporting frame includes a pair of leg members, each of the leg members are pivotally movable between a retracted position and an extended position, the leg members are adapted to be in contact with the supporting surface in both the retracted position and the extended position, and the fire bowl is located further from the supporting surface when the leg members are in the extended position as opposed to the retracted position.

In yet a further embodiment, the shelf in the usage position has a working surface. In still yet a further embodiment, the shelf comprises at least one utensil retaining groove. In another embodiment, the shelf has a working surface in the usage position and a utensil is to be located within the utensil retaining groove so the utensil is located beneath the working surface when the shelf is in the usage position. For purposes of this invention, a utensil includes, but is not limited to, spatulas, forks, and tongs. In still another embodiment, the first and second shelves have utensil storage grooves which function to provide utensil storage locations when the first and second shelves are in the storage position.

In yet another embodiment, the apparatus comprises a lid mountable on the fire bowl. In still yet another embodiment, the lid is pivotally mounted to the fire bowl, and the lid being movable from a closed position wherein the lid covers the grill to an open position wherein the lid allows access to the grill. In a further embodiment, the supporting frame of the apparatus includes a pair of main frame members, each of the main frame members are channel shaped defining an internal cavity, and the leg is mounted within the internal cavity.

In another embodiment, the first shelf is situated atop the second shelf in a staggered position during the stowage position. In still another embodiment, the shelf rests upon the grill during the stowage position.

In still a further embodiment, the barbecue cooking system comprises a fire bowl having an internal chamber, a grill located within the internal chamber, a lid mountable on the fire bowl, a stand for supporting the fire bowl, and at least one shelf pivotally mounted to the fire bowl with the shelf being foldable into the fire bowl to a storage position and extendable from the fire bowl during a usage position.

The system is a portable cooking system. The cooking apparatus and system of the present invention is designed primarily for outdoor use.

In still another embodiment, the system further comprising a second shelf pivotally mounted to the fire bowl, the second shelf being foldable into the fire bowl during a stowage position and extendable from the fire bowl during a usage position. In yet another embodiment, the first shelf is aligned with the second shelf in both the storage position and the usage position.

In still yet another embodiment, the shelf comprises at least one working surface and at least one utensil retaining groove. In a further embodiment, the stand comprises at least one movable leg. In still a further embodiment, the leg is retractable and extendable. In yet a further embodiment, the leg terminates into a wheel. In another embodiment, the fire bowl is situated upon a stand during a usage position with the stand being designed to fit onto the lid during a stowage position.

In still yet another embodiment, the lid is pivotally mounted onto the fire bowl, the lid being movable from a closed position wherein the lid covers the grill to an open position wherein the lid allows access to the grill. In still yet another further embodiment, the internal chamber comprises a compartment for retaining burnable material such as coal.

In a further embodiment, the system further comprises a manually operated tightening device and a latching device. In another further embodiment, the tightening device is any device designed for securing the leg when the leg is in an extended position. For purposes of this invention, tightening devices include, but not limited to, screws, bolts and other fasteners. In still a further embodiment, the latching device is any device designed for locking the leg in the retracted position.

In another embodiment, the system further comprising a propane tank, the tank is situated within the fire bowl during the stowage position and externally of the fire bowl during the usage position. In still another embodiment, the system further comprising at least one utensil, the utensil is positioned within the utensil retaining groove of the shelf. In yet another embodiment, the fire bowl having a bottom which is connected to a pair of planar or slightly bowed sidewalls with the bottom being located between the sidewalls. The bottom has an arcuate shape which extends from a fore end to an aft end. The sidewalls having a free upper edge which is flush with the fore end and the aft end. In another embodiment, the shelf is foldable into the internal chamber of the fire bowl.

In a further embodiment, the present invention relates to a cooking apparatus comprising: a fire bowl having an internal chamber, a grill located within the internal chamber, a lid mountable on the fire bowl, and at least two shelves, each of the shelves are pivotally mounted to the fire bowl, each of the shelves being movable between a stowage position within the fire bowl to a usage position located exteriorly of the fire bowl. In another embodiment, the first shelf is situated atop the second shelf in a staggered position during a stowage position. In still a further embodiment, the apparatus further comprising a stand, the fire bowl being situated upon the stand during a usage position, the stand being designed to fit onto the lid during a stowage position. In yet a further embodiment, at least one of said shelves of the apparatus of the present invention rests upon the grill during the stowage position.

In still another embodiment, the present invention relates to a cooking apparatus comprising: a fire bowl and a supporting frame being mounted on the fire bowl, at least one pair of leg members being pivotally mounted on the supporting frame and movable between a retracted position and an extended position, the leg members adapted to be in contact with a supporting surface in both the retracted and extended positions, the fire bowl being located further from the supporting surface when the leg members are in the extended position as opposed to the retracted position. In yet another embodiment, the leg members are crossed when in the retracted position. In still yet another embodiment, the leg members are located parallel and spaced apart when in the extended position.

In a still further embodiment of this invention, the fire bowl has a bottom which is located between and connected to a pair of sidewalls with this bottom having an arcuate shape which extends from a left side to a right side.

In another embodiment, the present invention relates to a method of manufacturing a cooking apparatus, the method comprising: providing a fire bowl having an internal chamber; positioning a grill within the internal reservoir; and pivotally mounting at least one shelf onto the fire bowl, the shelf being movable between a stowage position within the fire bowl to a usage position located exteriorly of the fire bowl.

In a yet further embodiment of this invention, there is a fire bowl mounted on an supporting frame with a pair of leg members pivotally mounted on the supporting frame and movable between a retracted position and an extracted position. In a still further embodiment, the supporting frame includes main frame members which are channel shaped defining an internal cavity with each leg member being mounted within an internal cavity. In a still further embodiment, the leg members are crossed when in the retracted position. In a still further embodiment, the legs are parallel but spaced apart when in the extended position. In a still further embodiment, the leg members include low frictional rolling means. In a still further embodiment, there is included a manually operable tightening member for securing the leg members in the extended position. In yet a further embodiment of this invention, there is included a latching means for locking of the leg members in the retracted position.

In a still further embodiment of this invention, there is defined a cooking apparatus which has a fire bowl and a lid removably engagable with the fire bowl. A stand is to be locatable underneath the fire bowl or locatable about the lid. In yet a further embodiment of this invention, the fire bowl includes a pair of spaced apart handles. In yet a further embodiment of this invention, the stand is to connect with the handles when the cooking appliance is in the position of not being used.

BRIEF DESCRIPTION OF THE DRAWINGS

The accompanying drawings are included to provide a further better understanding of the present invention. These drawings are incorporated and constitute a part of the specification, illustrate several embodiments of the present invention, and together with the description, serve to explain the principles of the present invention.

FIG. 1 is an isometric view of cooking apparatus of this invention showing the first embodiment of cooking apparatus in its most compact position with the lid being mounted on the fire bowl and the leg assembly of the supporting frame in a retracted position;

FIG. 2 is a cross-sectional view through the leg assembly of the supporting frame of the first embodiment of cooking apparatus of this invention taken along line 2—2 of FIG. 1;

FIG. 3 is an isometric view of the first embodiment of cooking apparatus of this invention showing the lid removed and also showing a propane tank and utensils being mounted in a stowed position in conjunction with a pair of shelves that are also located in a stowage position on the grill of the first embodiment of cooking apparatus and with the leg assembly of the supporting frame being located in the extended (usage) position;

FIG. 4 is a cross-sectional view through the leg assembly taken along line 4—4 of FIG. 3;

FIG. 5 is an isometric view of the cooking apparatus of this invention showing such in its typical usage position;

FIG. 6 is an isometric view of a second embodiment of cooking apparatus of this invention showing the second embodiment of cooking apparatus in its most compact position with the lid being mounted on the fire bowl and the leg assembly of the supporting frame in the retracted position;

FIG. 7 is a cross-sectional view through the lid latching assembly of the second embodiment of cooking apparatus of this invention taken along line 7—7 of FIG. 6 with this latching assembly being also employed within all embodiments of this invention that utilize a propane tank;

FIG. 10 is an isometric view of a third embodiment of cooking apparatus of this invention showing the third embodiment of cooking apparatus in its most compact position with the lid being mounted on the fire bowl and the leg assembly of the supporting frame in a retracted position;

FIG. 11 is a cross-sectional view taken along line 11—11 of FIG. 10 showing the mounting arrangement between the fire bowl which is not only used in conjunction with the third embodiment of this invention, but is also used within the first and second embodiments of this invention;

FIG. 12 is a cross-sectional view similar to FIG. 11 showing the lid being disengaged from the fire bowl where in FIG. 11 the lid was engaged with the fire bowl;

Figure 8:
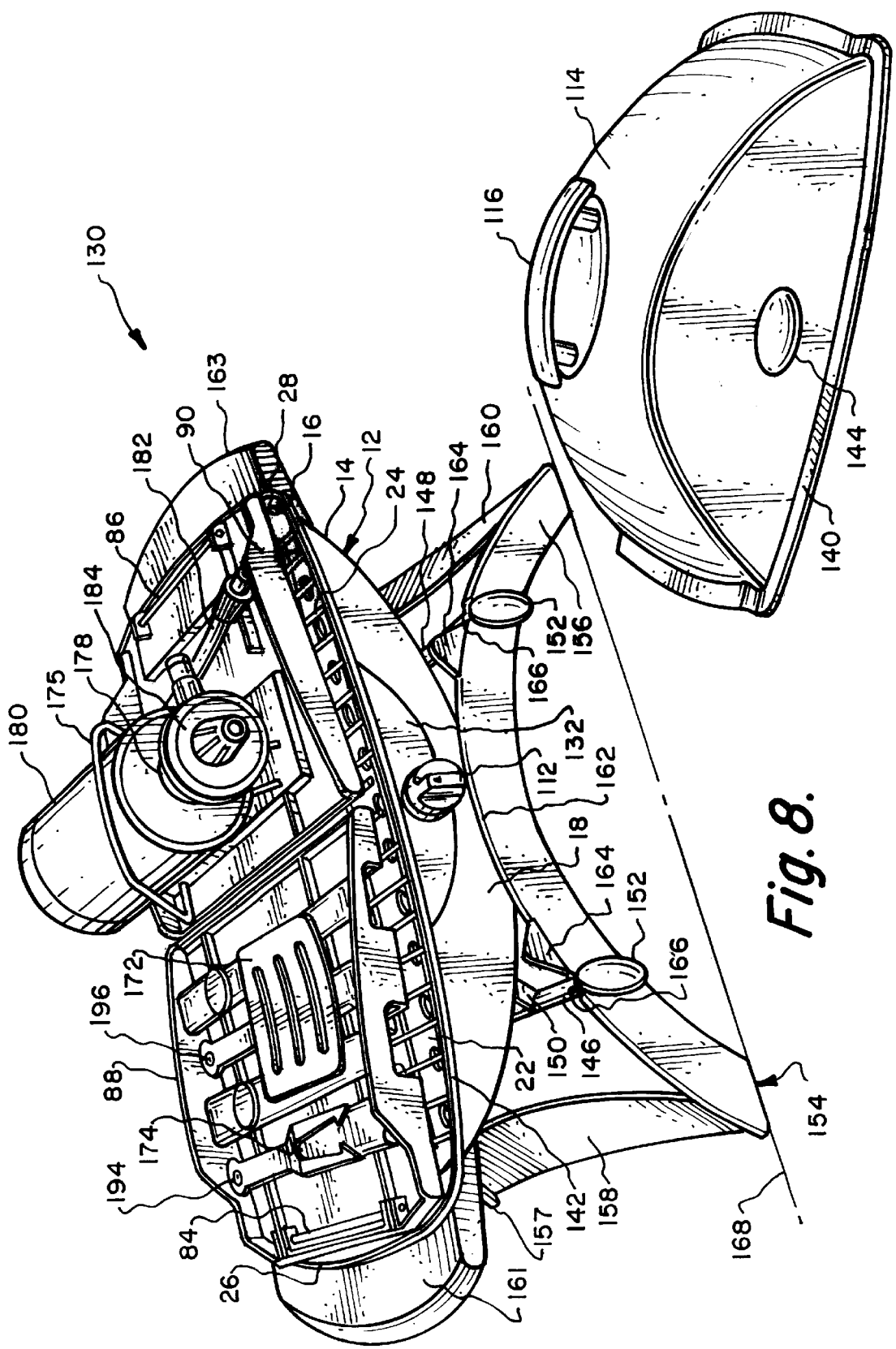
FIG. 8 is an isometric view of the second embodiment of cooking apparatus of this invention showing the lid removed and also showing the propane tank and utensils being mounted in a stowed position in conjunction with a pair of shelves that are also located in a stowage position on the grill of the second embodiment of cooking apparatus and with the leg assembly of the supporting frame being located in the extended (usage) position.
Figure 9:
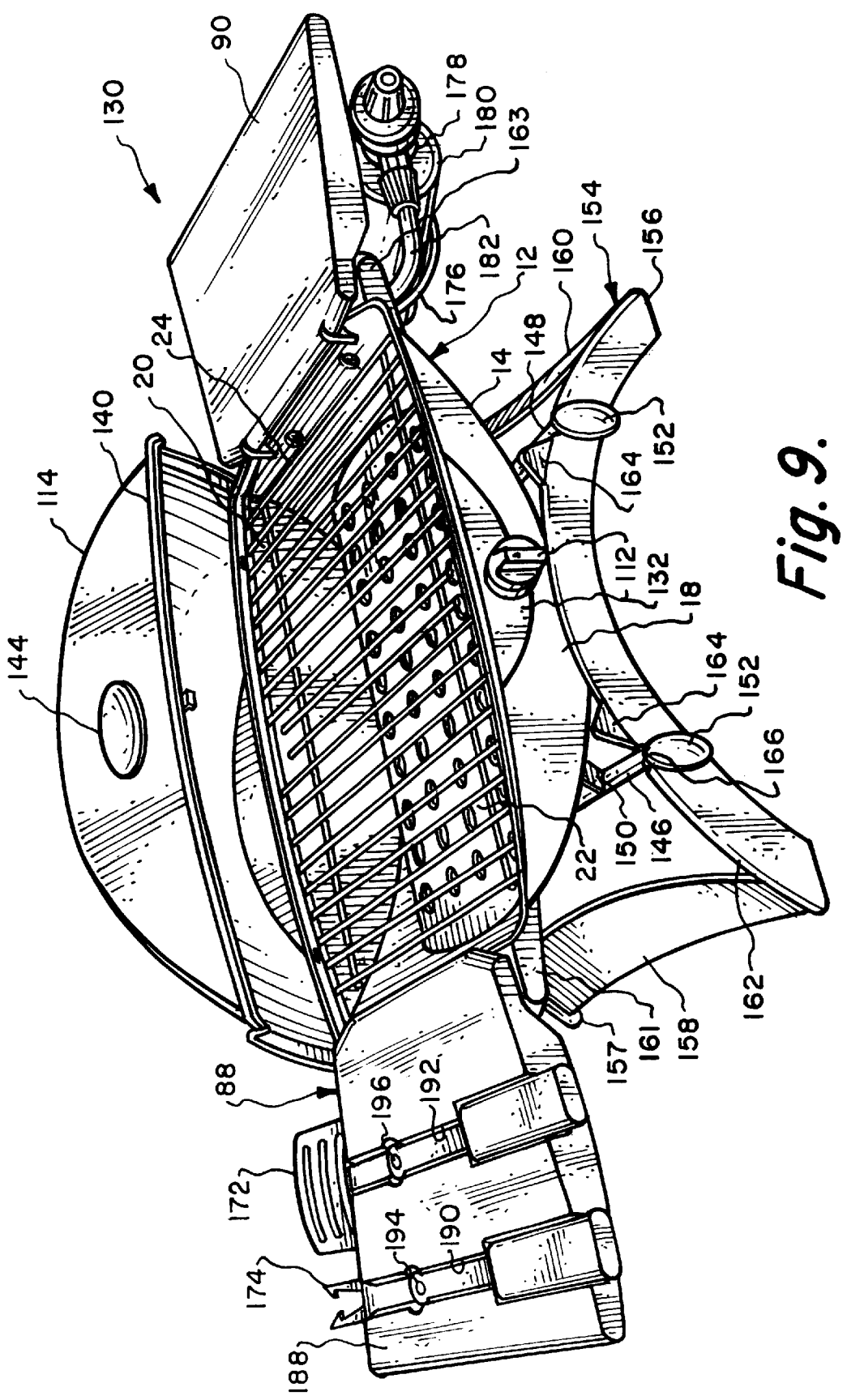
FIG. 9 is an isometric view of the second embodiment of cooking apparatus of this invention with the pair of shelves being moved to an outwardly extended position and the second embodiment of cooking apparatus in position for usage.
Figure 13:
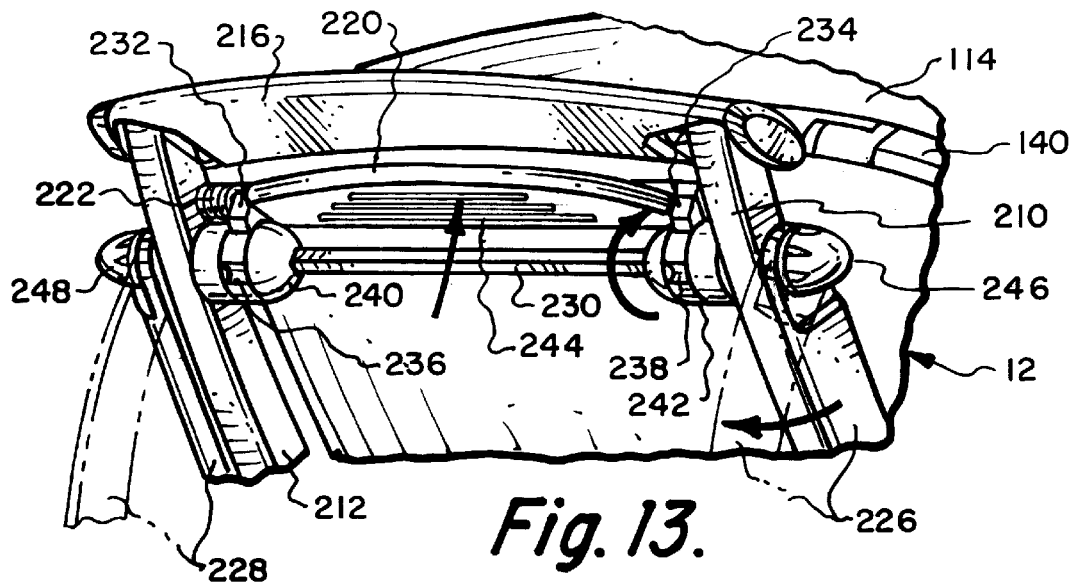
FIG. 13 is a cross-sectional view through the latching mechanism for the leg assembly of the third embodiment of cooking apparatus of this invention taken along line 13—13 of FIG. 10.
Figure 14:
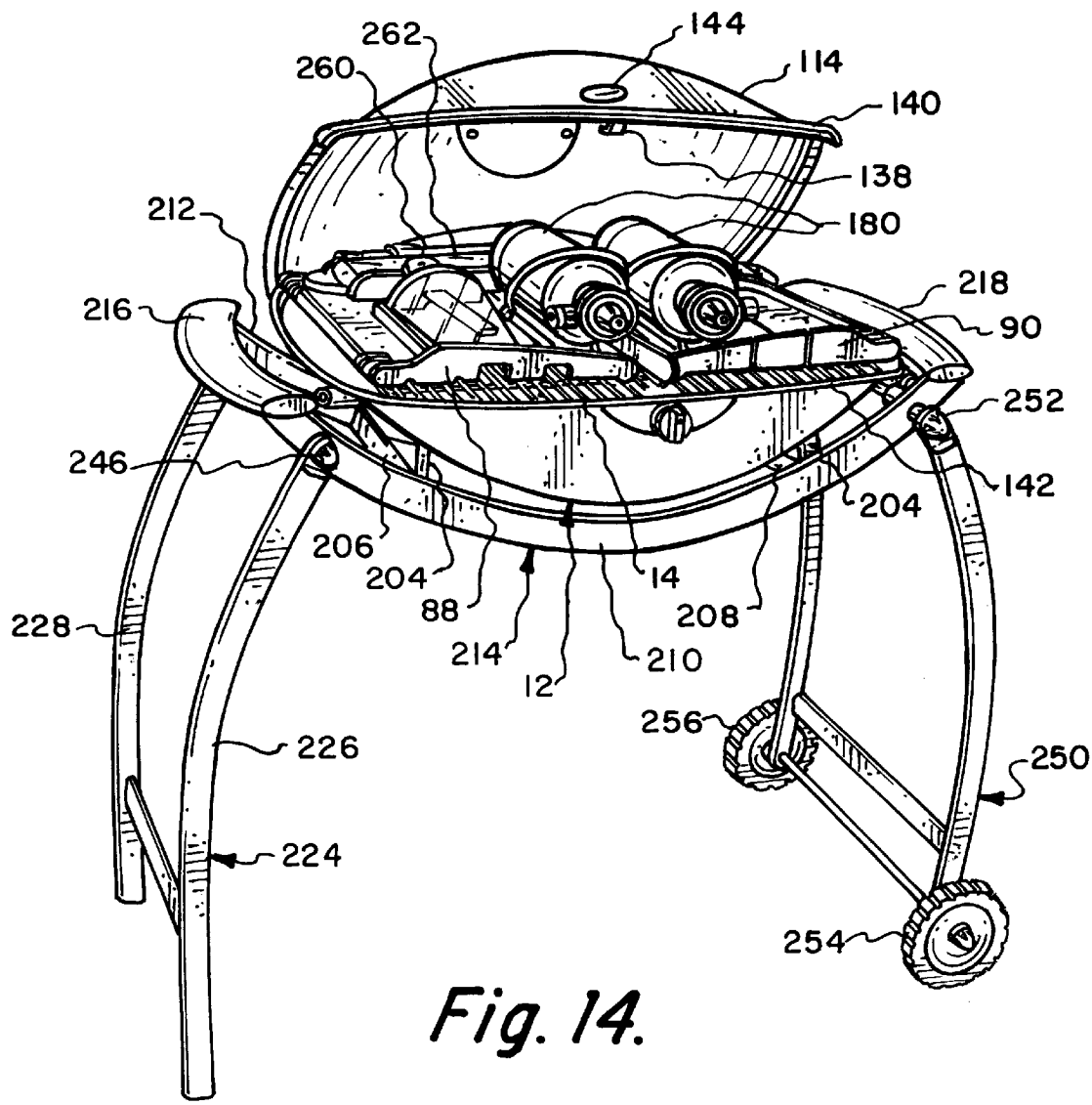
FIG. 14 is an isometric view of the third embodiment of cooking apparatus of this invention showing the lid in an open position and the leg assembly in the extended position which is the normal position for usage of the cooking apparatus.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention and may be embodied in various forms. The figures are not drawn necessarily to scale and some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Referring particularly to the drawings, there is shown the first embodiment of cooking apparatus 10 of this invention which has a fire bowl 12. The fire bowl 12 has a bottom 14. Typically, the fire bowl 12 will be constructed of steel or iron. The bottom 14 assumes a smooth, arcuate shape so that the bottom 14 is basically concave relative to the internal chamber 16 of the fire bowl 12. The fire bowl 12 also includes a front 18 and a back 20. The sides 18 and 20 are slightly curved being convex from the exterior. The bottom 14 is also curved arcuately in the direction from front 18 to back 20. This forming of the fire bowl 12 is to maximize the reflecting or application of heat from the heating unit 22 that is contained within the internal chamber 16. Mounted at the upper end of the internal chamber 16 is a cooking grill 24. It is to be noted that the upper edge of the front 18 and back 20 are substantially flush to the upper edge of the left side 26 and the right side 28 of the fire bowl 12.

The bottom 14 of the fire bowl 12 is fixedly mounted onto a supporting frame 30. The supporting frame 30 includes a pair of parallel, spaced-apart arcuate main members 32 and 34 which are in a bowl shape resembling a basic cradle configuration. Within that cradle is mounted the fire bowl 12. Extending between the members 32 and 34 are cross braces 36 and 38. The fire bowl 12 is fixedly mounted onto the cross braces 36 and 38 by mounts 40.

One end of the supporting frame 30 terminates in a handle 42 with the opposite end of the supporting frame 30 terminating in a handle 44. The handle 42 is located directly adjacent but slightly spaced from the left side 26. The handle 44 is located directly adjacent but slightly spaced from the right side 28.

The main member 32, as well as main member 34, is basically configured to be channeled shaped having an internal cavity 46. This cavity 46 is open at the bottom. A leg assembly composed of leg members 48 and 50 is to be mounted between the main members 32 and 34. The leg member 48 is pivotally mounted by pivot pins 52 and 54 respectively to the main members 32 and 34. The leg member 48 includes legs 56 and 58 with leg 56 being pivotally mounted by the pivot pin 52 to the main member 32 and leg member 58 being pivotally mounted by the pivot pin 54 to the main member 34. The outer end of the legs 56 and 58 has extending therebetween a cross member 60.

The leg member 50 includes a similar pair of legs with only leg 62 being shown. The leg 62 is pivotally mounted by a pivot pin 64 to the main member 32. Extending between the legs 62 and the not shown leg of the leg member 50 is a cross member 66.

The leg members 48 and 50 can be located in a retracted position relative to the supporting frame 30 which will locate the cross member 60 in conjunction with a notch 68 formed within the main member 32 and the cross member 66 engaging with a notch 70 formed within the main member 32. With the leg members 40 and 50 in this retracted position, the leg member 48 includes a pair of leg extensions 72 and 74 which are to be located on a supporting surface 76. It is to be noted that in this position the main members 32 and 34 will be located also very near the supporting surface 76, generally no more than a fraction of an inch therefrom. The leg member 50 also includes a similar pair of leg extensions with only leg extension 78 being shown.

When the leg member 48 is moved clockwise to an extended position, and the leg member 50 moved counter-clockwise to an extended position, the leg member 78 moves within the internal cavity 46 of the main member 32. When the leg extension 78 contacts the upper end of the internal cavity 46, this will define the limit of movement of the leg member 50 to the extended position. Such also is to occur for the leg member 48 with the leg extensions 72 and 74 as well as the not shown leg extension for leg member 50. It is to be noted that when the leg members 48 and 50 are in the retracted position, the shape of the legs 56, 58, 62 and the not shown leg of leg member 50 will nest within the internal cavity 46 in a close conforming manner of the main members 32 and 34 respectively. It is to be noted that the leg members 40 and 50 will automatically remain in their retracted position until such is moved from the retracted position to the extended position. The extended position of the leg members 48 and 50 locates the outer end of the leg members 48 and 50 against the supporting surface 76.

Fixedly mounted to the fire bowl 12 at the fore end 26 is a mounting bar 80. A similar mounting bar 82 is fixedly mounted to the fire bowl 12 at the aft end 28. Mounted on the mounting bar 80 is a pivot rod 84. A similar pivot rod 86 is pivotally mounted on the mounting bar 82. Connected to the pivot rod 84 is the inner end of a first shelf 88. The inner end of a second shelf 90 is connected to the pivot rod 86. The first shelf 88 is capable of being pivoted from a stowage position located within the confines of the internal chamber 16 shown in FIG. 3 of the drawings to an extended position which is shown in FIG. 5 of the drawings. Similarly, the second shelf 90 is capable of being pivoted one hundred eighty degrees from the stowage position shown in FIG. 3 to an extended position shown in FIG. 5. In the stowage position shown in FIG. 3, the shelves 88 and 90 are located in juxtaposition and in alignment. In FIG. 5, the shelves 88 and 90 are no longer in juxtaposition but are still in alignment. The shelf 88 has a planar working surface 92, and shelf 90 has a planar working surface 94. When shelf 88 is in the extended position shown in FIG. 5, the underside of the shelf 88 rests on the handle 42. Similarly, when the shelf 90 is in the extended position shown in FIG. 5, the underside of the shelf 90 rests on the handle 44.

The bottom side of the shelves 88 and 90 is what are located in an upward facing direction when the shelves 88 and 90 are in the stowage position shown in FIG. 3. The undersurface of the shelves 88 and 90 includes a plurality of spaced-apart brace members 96 each of which includes notches 98. These notches 98 are to facilitate stowage of utensils, such as a spatula 100, tongs 102 and a fork 104. Also, there is provided sufficient space on the underside of the shelves 88 and 90 to accommodate a propane gas tank 106. The gas tank 106 can be removed and mounted on the supporting surface 76 in close proximity to the fire bowl 12. The forward end of the gas tank 106 is to be mounted in conjunction with a support 108 which is to rest on the supporting surface 76. It is necessary that the forward end of the gas tank 106 be at an elevated position to the rear end of the gas tank 106 in order for the gas tank 106 to supply gas properly through the conduit 110 to the heating unit 22.

Control of the gas from the tank 106 to the heating unit 22 is by a regulator 184. Igniting of the gas within the heating unit 22 would normally be accomplished by use of an ignition device such as a conventional match, which is not shown.

The lid 114 is to be removed by unlatching of a latch mechanism (not shown) in FIGS. 1–5) by turning of knob 112 and grasping of handle 116 from its position totally enclosing of the internal chamber 16 and separating of the lid 114 completely from the fire bowl 12, as is shown in FIG. 3. Propane tank 106 is then to be removed and placed as shown in FIG. 5, and the conduit 110 is connected to an appropriate connection, which is not shown, mounted on the bottom 14 of the fire bowl 12. The spatula 100, tongs 102 and fork 104 are then removed and shelf 88 pivoted one hundred eighty degrees to rest on the handle 42, and shelf 90 then being pivoted one hundred eighty degrees to rest on the handle 44. The handle of the spatula 100 is to be located within the longitudinal groove 118 formed within the working surface 92 of the shelf 88. Similarly, the tongs 102 is to be mountable in conjunction with a pair of elongated grooves 120 formed within the working surface 92. Similarly, the handle of the fork 104 is to be locatable in longitudinal groove 122 formed within the working surface 92. The depths of the grooves 118, 120 and 122 are such that the spatula 100, tongs 102 and fork 104 are located below the working surface 92 so that the working surface 92 is capable of being used by locating of a plate or other object thereon during performing of cooking on grill 24 even when the utensils are still mounted with the shelf 88. However, by using of the longitudinal grooves 118, 120 and 122, the spatula 100, tongs 102 and the fork 104 are ready at hand available for usage.

The lid 114 is connectable to the fire bowl 12 which is discussed in relation to the third embodiment of this invention which follows in the specification that permits the lid 114 to move to a tilted position, shown in FIG. 5, which provides access into the grill 24 without having the lid 114 separated completely from fire bowl 12. This position of the lid 114, which is shown in FIG. 5, would be common during cooking of food on the grill 24. The lid 114 includes a latching pawl 128 which is to engage with the side 18 in order to lock in position the lid 114 when it is in the completely closed position, which is shown in FIG. 1.

It is to be understood that the initial position of the grill will normally be that of FIG. 1. The operator will first put the leg members 48 and 50 to the extended position and then remove the lid 114 from the fire bowl 12. The propane tank 106 and the utensils 100, 102 and 104 are removed from the back side of the shelves 88 and 90. The shelves 88 and 90 are then moved to the extended position, which is shown in FIG. 5. The spatula 100 is located in conjunction with the longitudinal groove 118, the tongs 102 is located in conjunction with the longitudinal groove 120 and the fork 104 is located in conjunction with the longitudinal groove 122. The lid 114 can then be located in the tilted position in conjunction with side extensions 124 and 126. Turning of the knob 112 will initiate the supplying of the gas through conduit 110 to the heating unit 22 and upon ignition of the gas of the heating unit 22, the cooking apparatus 10 of this invention is now ready for usage. After usage, the procedure is reversed to place the cooking apparatus 10 back in the position shown in FIG. 1 which would mean that the cooking apparatus 10 is in a position for transportation and storage.

The following discussion is going to be in relation to the second embodiment, third embodiment and fourth embodiment of this invention. Like numerals will be utilized to refer to like parts in reference to the first embodiment 10 of this invention.

Referring particularly to FIGS. 6–9, there is shown the second embodiment 130 of cooking apparatus of this invention. The second embodiment 130 includes a fire bowl 12 which has a bottom 14, an internal chamber 16 and sides 18 and 20. Mounted within the internal chamber 16 is the heating unit 22 and a grill 24. The fire bowl 26 also has a fore end 26 and an aft end 28. Turning of knob 112 causes knob 112 to pivot relative to block 132 mounted on the exterior surface of the side 18. The knob 112 has fixedly connected thereto a rod 134. Rod 134 extends through a hole formed in the side 18 and is fixed to hook 136. Hook 136 can be pivoted into engagement with retainer 138. Retainer 138 is fixedly mounted on the inside surface of the lid 114. When the control knob 112 is turned counterclockwise to the maximum, the hook 136 will engage with the retainer 138, as is shown in FIG. 7 of the drawings. Movement of the control knob 112 ninety degrees in a counterclockwise direction will cause the hook 136 to become disengaged from the retainer 138 which will permit the lid 114 to be pivoted to an almost ninety degree tilted position, which is clearly shown in FIG. 9 of the drawings. The lid 114 has a peripheral depending lip 140 which is to overhangingly connect with in a close conforming manner an upstanding free edge 142 of the fire bowl 12. Mounted on the exterior surface of the lid 114 there may be included a manufacturing identifying emblem 144.

Fixedly mounted to the exterior surface of the bottom 14 are a pair of parallel spaced apart cross braces 146 and 148. The cross braces 146 and 148 are fixedly mounted to the bottom 14 by means of short rods 150. The outer end of each cross brace 146 and 148 has an enlarged head 152. The cross braces 146 and 148 are located transverse to the sides 18 and 20.

An arcuately shaped supporting stand 154 has a pair of parallel oriented spaced apart curved main members 156 and 157. Connecting between the main members 156 and 157 adjacent their ends thereof are connecting braces 158 and 160. Within the convex edge 162 of the main member 156 are mounted a pair of spaced apart protruding feet 164. Also formed within the convex edge 162 are a pair of slots 166. Cross brace 146 is to connect with a pair of the slots 166 with one slot 166 being in main member 156 and the other slot 166 being in the main member 157 that is parallel to and spaced from main member 156. Similarly, cross brace 148 is to be connectable with a similar pair of aligned slots 166. The connection of the cross braces 146 and 148 within the respective slots 166 is in a snug manner so that the support stand 154 will be held in position in conjunction with the cross braces 146 and 148. When the cross braces 146 and 148 are located within the slots 166, the support stand 154 is mounted so as to space the fire bowl 12 some distance away from the supporting surface with it being understood that the outer ends of the main members, such as main member 156, are resting on the supporting surface 168.

Each of the main members 156 and 157 have formed on their inside surface a pair of slots 170 which are similar to slots 166. Each cross brace 146 and 148 can snugly connect with an aligned set of slots 170 which will locate the support stand 154 in the position shown within FIG. 6 of the drawings. This is the stowage position of the support stand 154 which is to be utilized when the second embodiment 130 is not being operated.

Pivotally mounted to the fore end 26 is a first shelf 88 with a second shelf 90 being pivotally mounted to the aft end 28. This pivot mounting is obtained by using pivot rods 84 and 86 respectively. The shelves 88 and 90 can be pivoted to an outward extending position with first shelf 88 resting on handle 161 and shelf 90 resting on handle 163. The handles 161 and 163 are also to function to physically pick up and transport the second embodiment 186 of cooking apparatus. The inside surface of the first shelf 88 includes a series of recesses which facilitate stowage of utensils, such as the spatula 172 and the fork 174. Mounted on the undersurface of the shelf 90 is a wire holder in the form of a pair of wire hangers 176 and 178. The wire hangers 176 and 178 connect with propane tank 180. When the shelf 90 is pivoted one hundred eighty degrees from the position shown in FIG. 8 to the position shown in FIG. 9, which is the extended position of the shelf 90, propane tank 180 will be held in position against the under surface of the shelf 90 but permitted to be located at approximately a thirty degree inclined angle. This inclination is necessary in order for the propane to move the flow in a desirable manner through the connecting hose 182 to the burner unit, which is not shown. It is to be noted that the second embodiment 130 is of a smaller configuration than the first embodiment 10. Because of this, it was necessary to fold in half the utensils composing of the spatulas 172 and 174 so as to cut down the length of such in order to achieve stowage against the under surface of the shelf 88. The shelf 88 in FIG. 9 has within its working surface 188, which is the upper surface, a pair of elongated grooves 190 and 192. When the fork 174 is pivoted about its pivot joint 194 from the collapsed position to the expanded position, it then can be mounted within the groove 190 so that the fork 174 is located totally beneath the working surface and does not interfere with the utilization of the working surface 188. The same is true for the spatula 172 if it is pivoted from its collapsed position about pivot joint 196 to the expanded position and inserted within the groove 192.

Referring particularly to FIGS. 10–15 of the drawings, there is shown the third embodiment 186 of cooking apparatus of this invention. The third embodiment 186 is to be the largest of the first three embodiments, and because of its size, it is not easily as portable as the first embodiment 10 and the second embodiment 130. The fire bowl 12 of the third embodiment 186 is substantially larger in size. The back side of the lid 114 includes a pair of spaced apart protuberances 198 and 200. Each protuberance 198 and 200 is to connect with a hole formed within the fire bowl 12 with only hole 202 being shown. The holes, such as hole 202, are formed within the free edge 142 of the fire bowl 12. The connection arrangement between the protuberances 98 and the holes 202 is such that it will permit the lid 114 to pivot to an upward position and be supported in that position with the lid 114 assuming a tilted position.

Fixedly mounted to the bottom 14 of the fire bowl 12 are four in number of short rods 204. Two of the short rods 204 are fixed to cross brace 206 with the remaining two in number of short rods 204 being fixed to the cross brace 208. The cross braces 206 and 208 are fixed between a pair of main members 210 and 212 of the supporting frame 214. The left end of the supporting frame 214 terminates in a handle 216 with the right end of the supporting frame 214 terminating in a handle 218. Mounted underneath each handle 216 and 218 is a latch plate with only latch plate 220 being shown for handle 216. The latch plate 220 is forced by a coil spring 222 to an at-rest position. This at-rest position will lock the leg assembly 224 in its upper position, which is shown in FIG. 10 of the drawings. Connected between the leg members 226 and 228 of the leg assembly 224 is a rod 230. The latch plate 220 has a pair of pawls 232 and 234 located at opposite ends of the plate 220. The pawls 232 and 234 are to engage respectively with recesses 236 and 238 which are formed respectively within spools 240 and 242 which are fixedly mounted onto the rod 230. When the latch plate 220 is lifted in the direction of arrow 244, the pawls 232 and 234 are removed from their respective recesses 236 and 238 which will permit the leg assembly 224 to be pivoted to the outwardly extending position shown in FIG. 14. In this outwardly extending position, knob 236 can be manually tightened so as to fix in position the leg assembly 224 in this outwardly extended position. In a similar manner, knob 238 can be tightened which will further fix in position the leg assembly 224 in this outwardly extended position.

In a similar manner, a latch plate which is mounted under the handle 218 is to be moved in the same way in order to permit the leg assembly 250 to be pivoted to an outwardly extended position. Again, knobs 252 are to be tightened which will secure in position the leg assembly 250 in this outward extended position. The leg assembly 250 is to include wheels 254 and 256. The wheels 254 and 256 facilitate low frictional rolling movement of the third embodiment 186 of this invention by lifting on handle 216 and then rolling of the third embodiment 186 on the wheels 254 and 256. It is to be noted that the leg assembly 250 assumes a crossed position relative to the leg assembly 224 when in the upper or retracted position shown in FIG. 10. The leg assembly 250 is essentially parallel to the leg assembly 224 when in the outwardly extended or usage position shown in FIG. 14.

Mounted on the grill 24 are a pair of shelves 88 and 90. The only difference is that because of the size of the fire bowl 12, there will be normally included two separate burners within the internal chamber of the fire bowl 12. Therefore, each burner has to have its own separate butane tank with their being two butane tanks 180 hung by wire hangers 176 and 178 with there being a separate butane tank 258 located under each shelf 88 and 90.

Figure 15:
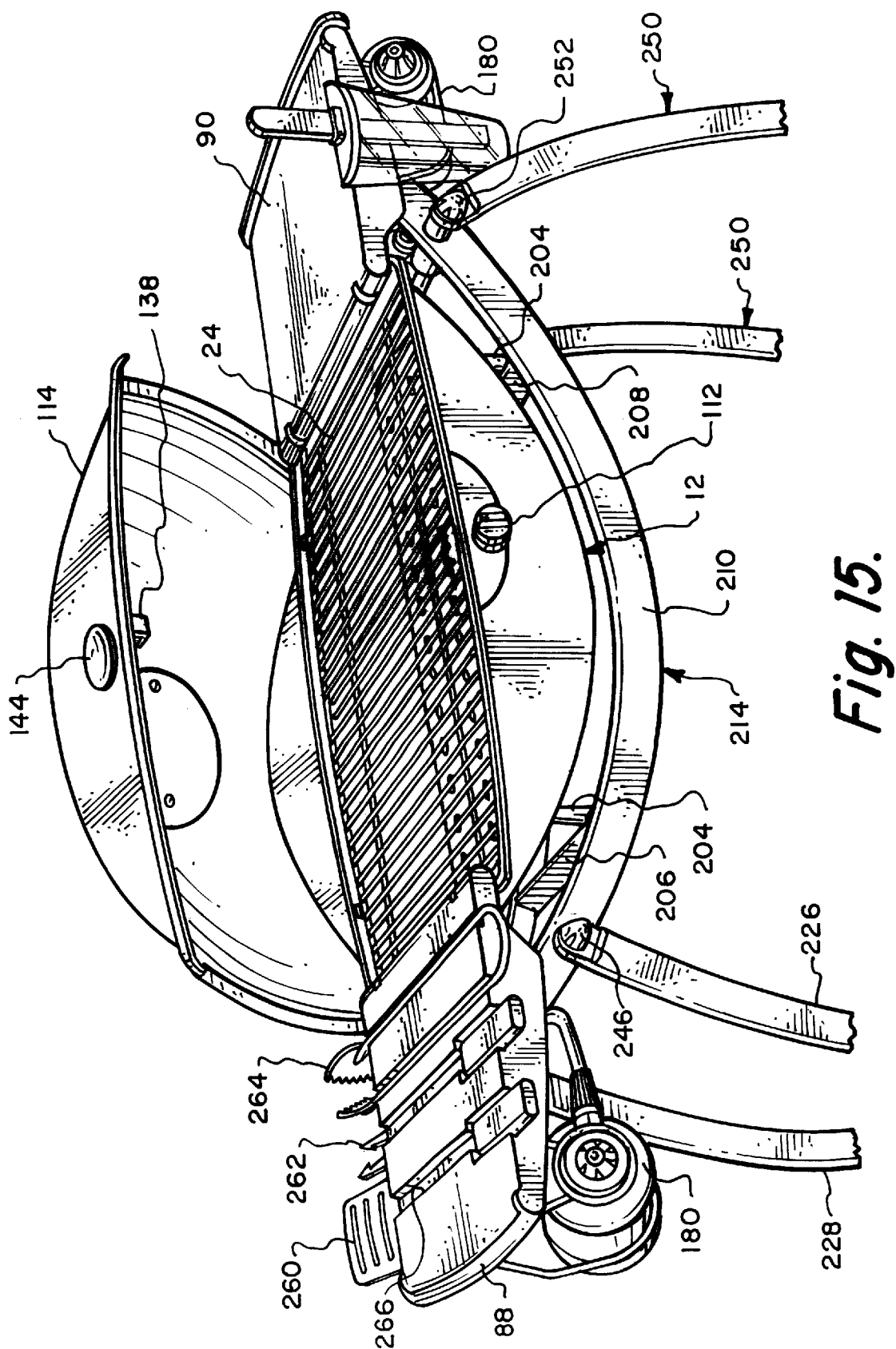
FIG. 15 is an isometric view of the fire bowl of the third embodiment of the cooking apparatus of this invention showing the shelves being moved from the stowage position to an outwardly extended position which would be the normal usage position of the third embodiment of this invention.

Along with the utensils 260 and 262, which can be mounted in a stowage position between the shelves 88 and 90 when such are mounted on the grill 24, there also may be included a basting container 262. This basting container 262 can be disengaged from the back side of shelf 88 and mounted on the shelf 90, as is shown in FIG. 15. The utensils 260 and 262, which comprise a spatula and fork respectively, can also include tongs 264. When the shelves 88 and 90 are in an outwardly extended position with shelf 88 being supported on the handle 216 and shelf 90 being supported on the handle 218, the spatula 260, the fork 262 and the tongs 264 can be mounted within grooves 266 formed in the upper surface of shelf 88. Again, the mounting of the spatula 260, fork 262 and tongs 264 are such that it is located beneath the working surface of the shelf 88.

Figure 16:
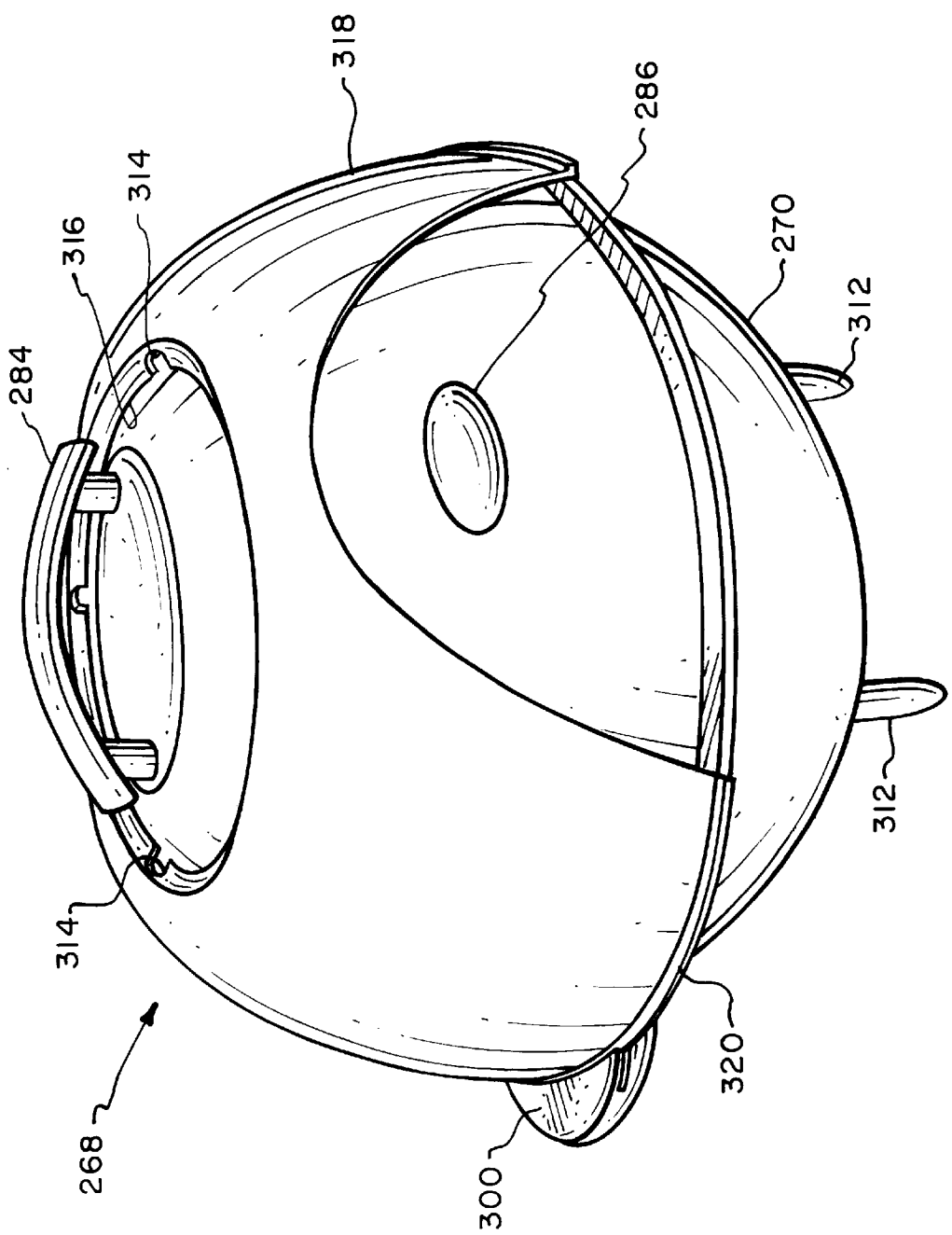
FIG. 16 is an isometric view of a fourth embodiment of cooking apparatus of this invention showing the fourth embodiment of cooking apparatus in its most compact position with the lid being mounted on the fire bowl and a supporting base being mounted in conjunction about the lid and latched to the handle assembly that is mounted on the fire bowl.
Figure 17:
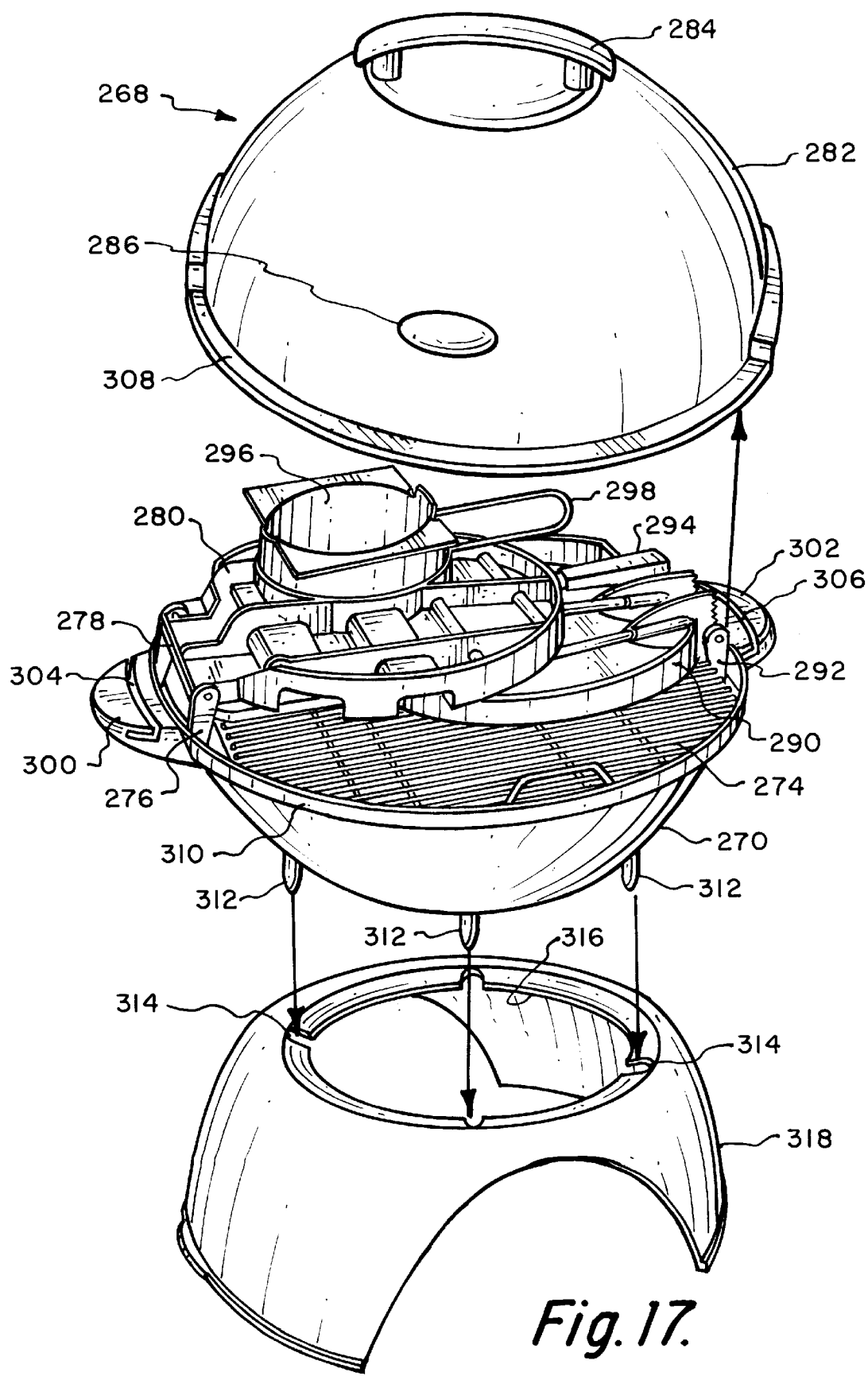
FIG. 17 is an exploded isometric view of the fourth embodiment of cooking apparatus of this invention showing the supporting base being removed from the lid and placed underneath the fire bowl with the lid disengaged from the fire bowl.
Figure 18:
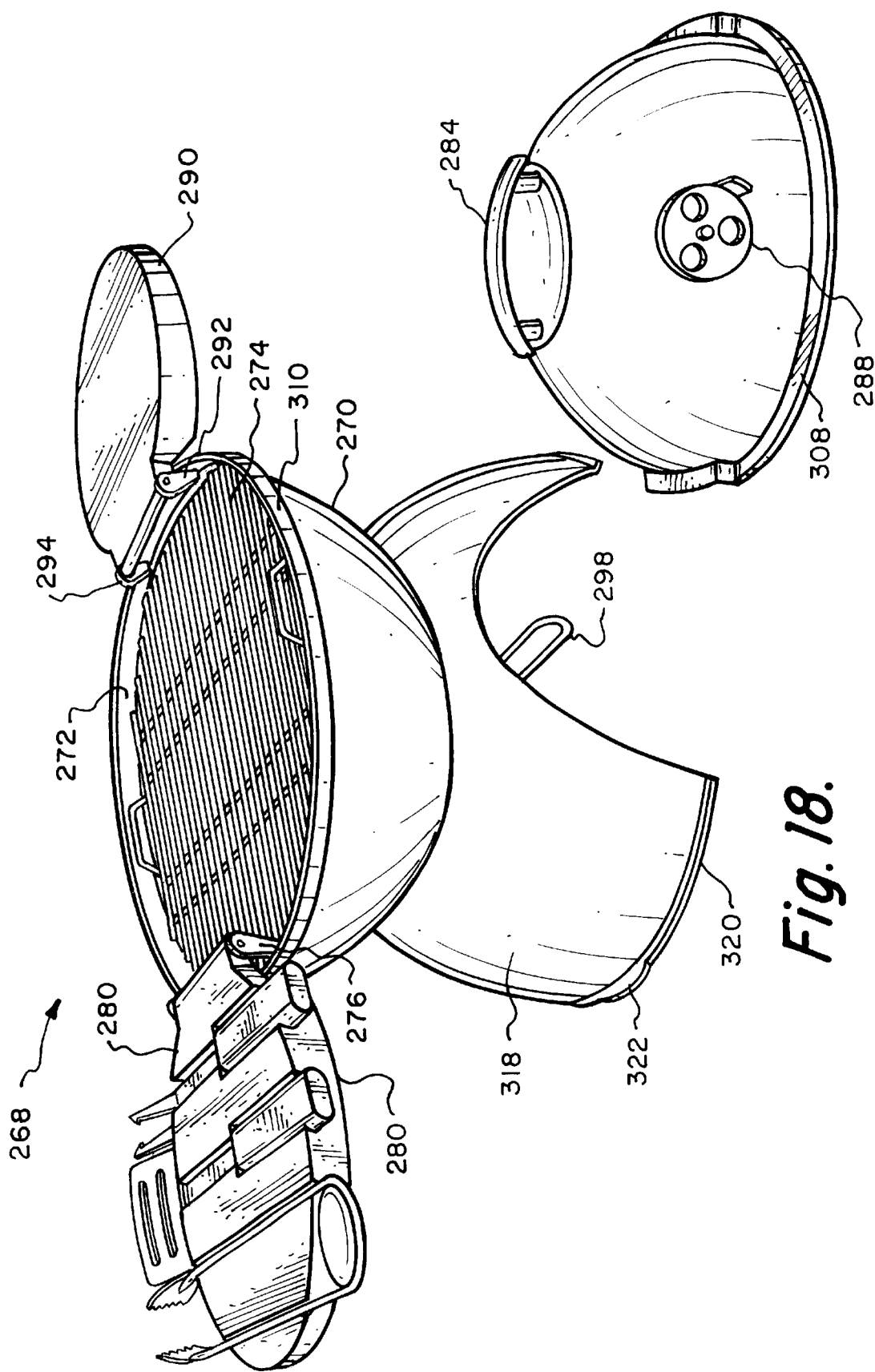
FIG. 18 is an isometric view of the fourth embodiment of cooking apparatus of this invention showing the lid removed and showing the pair of shelves in conjunction with the fourth embodiment of cooking apparatus being moved to the extended position which is a position of usage and also showing the fire bowl being supported on the supporting base.

Referring particularly to FIGS. 16–18 of the drawings, there is shown a fourth embodiment 268 of cooking apparatus of this invention. The main distinction of the fourth embodiment 268 in relation to the first three embodiments of this invention is that the fourth embodiment 268 is designed to be used in conjunction with charcoal. Therefore, there is no butane tank. Within the fourth embodiment 268, the fire bowl 270 is bowl shaped having essentially a hemispherically shaped internal chamber 272. Mounted within the internal chamber 272 is a grill 274. It is to be understood that charcoal briquets (not shown) are to be placed within the internal chamber 272 underneath the grill 274 and to be ignited by using an appropriate igniter with food to be cooked on the upper surface of the grill 274.

Pivotally mounted to mounting members 276 and 278 is a shelf 280. Mounting members 276 and 278 are fixedly secured to the fire bowl 270. The shelf 280 is capable of being pivoted within the internal chamber 272 which also defines the interior enclosure of the lid 282. Lid 282 includes a handle 284 to facilitate picking up and replacing of the lid 282 relative to the fire bowl 270. The exterior surface of the lid 282 includes a manufacturing identifying emblem 286. The lid 282 will normally also include an adjustable air vent plate 288. Adjusting of the air vent plate 288 controls the amount of air that is being supplied within the internal chamber 272 when the lid 282 is mounted on the fire bowl.

The shelf 280 will actually rest against shelf 290 in a staggered relationship with shelf 290 actually resting on the grill 274 when in the stowage position. The shelf 290 is pivotally mounted by mounting members 292 and 294 which are secured to the fire bowl 270. The undersurface of the shelf 290 is to include grooves which is to facilitate stowage mounting of the utensils 294 which will be similar to the utensils that are shown within the third embodiment 186 of this invention. There can also be stored on the shelf 280 an ash collecting container 296. This ash collecting container 296 is mounted to a handle 298. Formed centrally within the fire bowl 270 is a hole, which is not shown. This ash collecting container 296 is to be connectable with that hole with the burned ash from the charcoal to be moved and collected within the collecting container 296 with that collecting container 296 to then be removed and the ash dispensed therefrom in an appropriate disposal container, which is again not shown.

Fixedly mounted onto the fire bowl 270 are a pair of diametrically spaced apart handles 300 and 302. Within the handle 300 is formed an arcuate through slot 304 with a similar arcuate through slot 306 being formed within the handle 302. When shelf 280 is pivoted to its outwardly extended position shown in FIG. 18, the lower surface of the shelf 280 is to rest on the handle 300. In a similar manner, when the shelf 290 is pivoted to its outwardly extended position, the bottom surface of the shelf 290 also rests on the handle 302. When the lid 282 is mounted on the fire bowl 270, the peripheral edge 308 overlaps the upper free peripheral edge 310 of the fire bowl 270.

When the fourth embodiment 268 is being used, it is necessary to space the fire bowl 270 above the supporting surface in order to prevent burning of the supporting surface. Mounted on the undersurface of the fire bowl 270 are four in number of evenly spaced apart feet 312. Each foot 312 is to engage with a notch 314 formed in the peripheral edge of enlarged opening 316 of a supporting base or stand 318. The stand 318 is basically domed shaped. The connection between the feet 312 and the notches 314 essentially locks in position the fire bowl 270 with the stand 318 when the fourth embodiment 268 is being used as a cooking apparatus.

After usage and the fire bowl 270 has been cooled, the user can manually lift the fire bowl 270 by handles 300 and 302 off of the stand 318. Prior to this, the shelves 280 and 290 have been pivoted to be in contact with the grill 274, as shown in FIG. 17. The user then places the lid 282 in position onto the fire bowl 270 after the ash collecting container 296 has been removed and placed against the bottom surface of the shelf 280. The stand 318 is then placed on top of the lid 282. The stand 318 includes a peripheral lip 320 which includes a pair of diametrically spaced apart widened areas 322. The stand 318 is then turned so that the widened areas 322 engage respectively with the grooves 304 and 306 and form a snug locking action therebetween. This will in essence lock the lid 282 to the fire bowl 270. The user can then grasp handle 284 and readily carry the entire fourth embodiment 268 in one compact unit.

Although the subject matter of this invention is shown and described in relation to cooking apparatuses that are portable, it is considered to be within the scope of this invention to use the inventive concepts in conjunction with stationary cooking apparatuses.

Numerous modifications and variations of the present invention are possible in light of the above teachings. It is therefore to be understood that within the scope of the attendant claims attached hereto, this invention may be practice otherwise than as specifically disclosed herein.

What is claimed is:

1. A cooking apparatus comprising:
   a fire bowl mounted on a supporting frame;
   at least one shelf pivotally mounted to said fire bowl, said shelf being movable between a stowage position within said fire bowl to a usage position located externally of said fire bowl; and
   at least one leg, said supporting frame comprising a pair of main frame members, each of said main frame members being channel shaped defining an internal cavity, said leg being mounted within said internal cavity.

2. The apparatus of claim 1 wherein said fire bowl has an internal chamber and said apparatus further comprises a grill located within said internal chamber.

3. The apparatus of claim 2 wherein said first and second shelves have utensil storage grooves which function to provide utensil storage locations when said first and second shelves are in said storage position.

4. The apparatus of claim 2 wherein said shelf rests upon said grill during said stowage position.

5. The apparatus of claim 1 further comprising a second shelf pivotally mounted to said fire bowl, said second shelf being movable between a stowage position within said fire bowl to a usage position located exteriorly of said fire bowl.

6. The apparatus of claim 5 wherein said first shelf is aligned with said second shelf in both said stowage position and said usage position.

7. The apparatus of claim 5 wherein said first shelf is situated atop said second shelf in a staggered position during said stowage position.

8. The apparatus of claim 1 wherein said fire bowl terminates into at least one end portion and said shelf is pivotally mounted to said end portion.

9. The apparatus of claim 1 wherein said fire bowl is mounted on said supporting frame, said supporting frame having at least one handle, said shelf resting on said handle when said shelf is in said usage position.

10. The apparatus of claim 1 wherein said supporting frame including a pair of leg members, each said leg member being pivotally movable between a retracted position and an extended position, said leg members adapted to be in contact with the supporting surface in both said retracted position and said extended position, said fire bowl being located further from said supporting surface when said leg members are in said extended position as opposed to said retracted position.

11. The apparatus of claim 1 wherein said shelf in said usage position has a working surface.

12. The apparatus of claim 11 wherein said shelf has a working surface in said usage position and a utensil retaining groove so the utensil is located beneath said working surface when said shelf is in said usage position.

13. The apparatus of claim 1 wherein said shelf comprises at least one utensil retaining groove.

14. The apparatus of claim 1 further comprising a lid mountable on said fire bowl.

15. The apparatus of claim 14 further comprising a grill situated within said fire bowl and wherein said lid is pivotally mounted to said fire bowl, said lid being movable in a closed position wherein said lid covers said grill to an open position wherein said lid allows access to said grill.

16. The apparatus of claim 1 wherein said fire bowl is mounted on a supporting frame, said apparatus further comprises a pair of leg members being pivotally mounted on said supporting frame and movable between a retracted position and an extended position, said leg members adapted to be in contact with a supporting surface in both said retracted position and said extended position, said fire bowl being located further from the supporting surface when said leg members are in said extended position as opposed to said retracted position.

17. The apparatus of claim 16 wherein said fire bowl has an internal chamber and said apparatus further comprises a grill located within said internal chamber, a lid mountable on said fire bowl and at least two shelves, each of said shelves being pivotally mounted to said fire bowl, each of said shelves being movable between a stowage position within said fire bowl to a usage position located exteriorly of said fire bowl.

18. The cooking apparatus as defined in claim 16 comprising:
   said supporting frame including a pair of main frame members which are spaced apart, each said main frame member being channel shaped defining an internal cavity, each said leg member being mounted within a said internal cavity.

19. The cooking apparatus as defined in claim 16 wherein:
   said leg members being crossed when in said retracted position.

20. The cooking apparatus as defined in claim 16 comprising:
   said leg members being located substantially parallel and spaced apart when in said extended position.

21. The cooking apparatus as defined in claim 16 wherein:
   one of said leg members having low frictional rolling means to facilitate moving of said cooking apparatus from one local to another.

22. The cooking apparatus as defined in claim 16 comprising:
   manually operable tightening means for securing of said leg members when in said extended position.

23. The cooking apparatus as defined in claim 16 comprising:
   latching means for locking of said leg members in said retracted position.

24. The apparatus of claim 1 wherein said fire bowl comprises a bottom which is connected to a pair of sidewalls with said bottom being located between said sidewalls, said bottom has an arcuate shape which extends from a left side to a right side, said sidewalls having a free upper edge.

25. A barbecue cooking system comprising:
   a fire bowl comprising peripheral walls, a continuous bottom and an open top, said peripheral walls defining an internal chamber, said peripheral walls comprising a top portion and an internal surface;
   a grill located within said internal chamber;
   a lid mountable on said fire bowl;
   a stand for supporting said fire bowl;
   at least one handle; and
   at least one shelf pivotally mounted to said peripheral walls at said internal surface and below said top portion of said fire walls, said shelf being foldable into said fire bowl during a storage position and extendable from said fire bowl during a usage position, said handle supporting said shelf during said usage position.

26. The system of claim 25 further comprising a second shelf pivotally mounted to said peripheral walls at said internal surface and below said top portion of said fire walls, said second shelf being foldable into said fire bowl during a stowage position and extendable from said fire bowl during a usage position.

27. The system of claim 25 wherein said first shelf is aligned with said second shelf in both said stowage position and said usage position.

28. The system of claim 25 wherein said shelf comprises at least one working surface and a means for holding utensils.

29. The system of claim 28 wherein said means for holding said utensils comprises a utensil retaining groove and said system further comprising at least one utensil, said utensil being positioned within said utensil retaining groove of said shelf.

30. The system of claim 25 wherein said fire bowl is situated upon said stand during a usage position and said stand being designed to fit onto said lid during a stowage position.

31. The system of claim 30 wherein said stand comprises at least one leg, said leg is retractable and extendable.

32. The system of claim 31 further comprising a manually operated tightening device and a latching device, said tightening device being designed for securing said leg when in said extended position, said latching device being designed for locking said leg in said retracted position.

33. The system of claim 25 wherein said lid is pivotally mounted onto said fire bowl, said lid being movable from a closed position wherein said lid covers said grill to an open position wherein said lid allows access to said grill.

34. The system of claim 25 wherein said internal chamber comprises a compartment for retaining burnable material.

35. The system of claim 25 further comprising a propane tank, said tank being situated within said fire bowl during said stowage position and externally of said fire bowl during said usage position.

36. The system of claim 25 wherein said fire bowl having a bottom which is connected to a pair of planar sidewalls with said bottom being located between said sidewalls, said bottom has an arcuate shape which extends from a fore end to an aft end, and sidewalls having a free upper edge.

37. The system of claim 25 wherein said shelf is foldable into said internal chamber.

38. A cooking apparatus comprising:
   a fire bowl comprising an exterior undersurface and a pair of spaced apart handles;
   a lid removably engagable with said fire bowl; and
   a stand to be locatable against said exterior undersurface to spacingly position said fire bowl from a supporting surface during a usage position, said stand being situated atop said lid in a close conforming manner and connected to said handles of said fire bowl during a non-use position.

* * * * *